Dec. 20, 1938.  E. WOOLER ET AL  2,141,145
CUSHIONED ROLLER BEARING AND MOUNTING
Filed Feb. 21, 1938
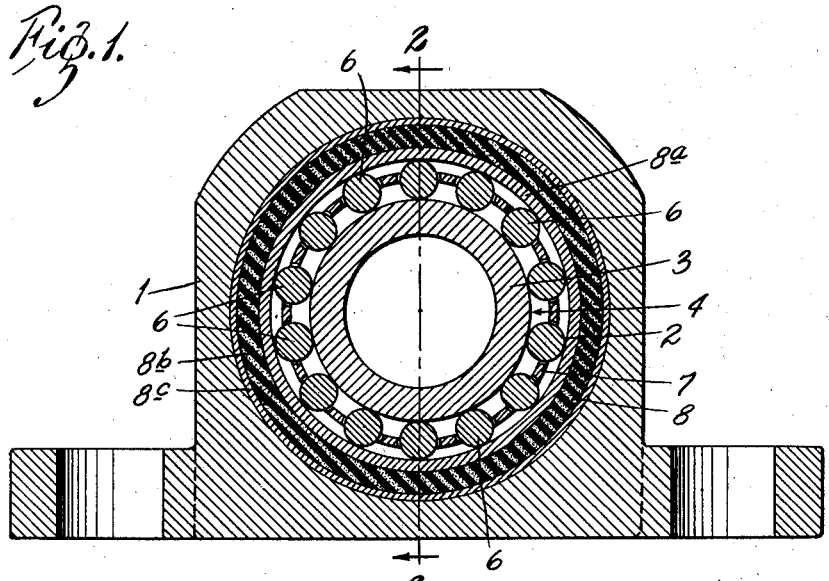
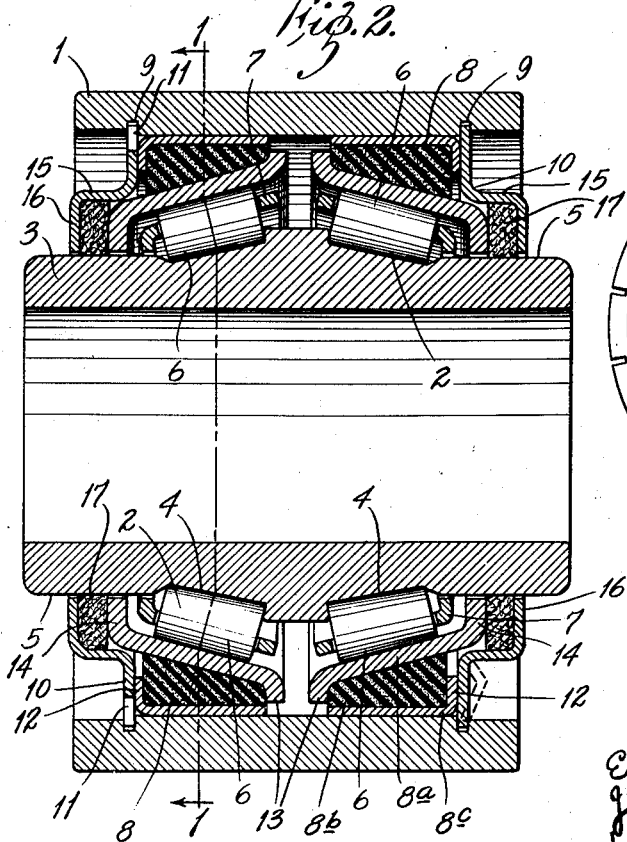
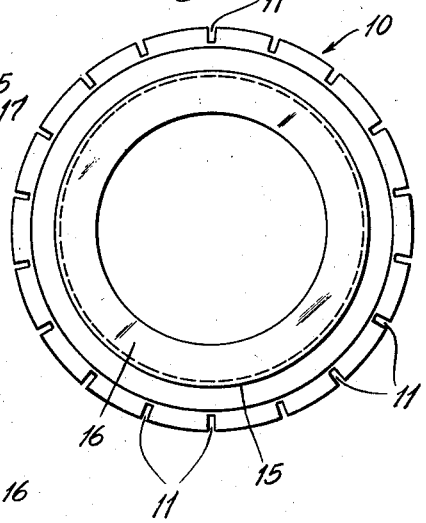
INVENTORS:
Ernest Wooler and
John B. Baker,
by Carr Carr & Gravely,
THEIR ATTORNEYS

UNITED STATES PATENT OFFICE 2,141,145

CUSHIONED ROLLER BEARING AND MOUNTING

Ernest Wooler and John B. Baker, Canton, Ohio, assignors to The Timken Roller Bearing Company, Canton, Ohio, a corporation of Ohio Application February 21, 1938, Serial No. 191,624

6 Claims. (Cl. 308—184)

Our invention relates to roller bearings, particularly taper roller bearings of the cushioned type shown in Boden application Serial No. 181,058 filed December 22, 1937 and has for its principal object a means for permanent bearing preload and self-alinement. Other objects are reduction of noise transmission and vibration and a simple and effective seal for such a bearing.

The invention consists in the cushioned roller bearing and mounting and in the parts and combinations and arrangements of parts hereinafter described and claimed.

In the accompanying drawing,

Fig. 1 is a cross-sectional view on the line 1—1 in Fig. 2 of a cushioned roller bearing and pillow block arrangement embodying my invention;

Fig. 2 is a longitudinal sectional view on the line 2—2 in Fig. 1; and

Fig. 3 is an elevation of one of the securing rings for holding a bearing cup in place.

Fig. 1 illustrates a pillow block construction including a housing or pedestal 1 through which extends a shaft, not shown in the drawing, a roller bearing, indicated generally by 2, being interposed between the housing 1 and the shaft. The present invention is concerned with a cushioned roller bearing adapted for use in such pillow block constructions, as well as for general use, and with the combination or assembly of such cushioned bearing in a pillow block or the like.

In Fig. 2 is illustrated a double cone 3 or inner bearing member having conical raceways 4 that taper outwardly and cylindrical end portions 5 that project to or beyond the ends of the housing. On each raceway 4 is a series of conical rollers 6, and a cage 7 is preferably provided for each series of rollers 6. A cushioned cup or outer bearing member, indicated generally by 8, for each series of rollers, is mounted in the housing 1. The housing 1 is provided with internal peripheral grooves 9 near its ends, in each of which is mounted a radially disposed retaining ring or washer 10, the outer periphery of which is preferably provided with notches 11 to facilitate insertion thereof into the groove 9. As indicated by the dotted lines in Fig. 2, said retaining ring may be dished or bent so as to reduce its outer periphery. When the ring is positioned at the mouth of the groove 9, its outer peripheral portion may be forced into the groove by straightening the disk into its normal radial position.

Each bearing cup 8 comprises a conical raceway portion 8a of hardened steel or other suitable metal, a core 8b of rubber or other resilient material having a conical interior to fit the outer surface of said raceway portion and a cylindrical outer periphery to fit in a cylindrical outer metal shell 8c. Said outer metal shell 8c has an inturned radially disposed flange 12 engaging the end face of the rubber core 8b and stopping short of the raceway shell 8a to allow for bulging of the rubber. The raceway portion 8a preferably has an outturned flange 13 at its larger end and an inturned radially disposed flange 14 at its smaller end which closely encircles a cylindrical portion 5 of the bearing cone.

Said retaining ring 10 has a sleeve portion 15 extending axially outwardly from its inner periphery and an inturned radial flange 16 at the outermost end of said sleeve. Interposed between said flanges 14 and 16 is a packing ring 17 of suitable material.

The cushioned cup may be proportioned so that considerable endwise pressure on the rubber is required to so position the cup 8 that the end flange 12 of the outer shell is held within the retaining ring 10, thus preloading the bearing. The rubber under compression automatically takes up wear in the bearing, compensates for misalinement of the cup seats, makes the bearing entirely self-alining, both radially and axially and increases the fatigue life of the bearing by reason of the rubber taking up shock and the self-alinement of the bearing reducing roller and loading or localized stress. The hardness of the rubber or resilient material can be varied as required. The inturned end flanges of the raceway portion and of the retaining ring cooperate to form a channel for the usual packing ring, thus providing an efficient closure with simplicity of construction and few parts. The bearing is easily assembled, various adjusting and positioning devices of ordinary bearing mountings being dispensed with. The bearing is well adapted for many other uses than the pillow block mounting illustrated.

Obviously numerous changes may be made without departing from the invention and we do not wish to be limited to the precise construction shown.

What we claim is:

1. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, said outer shell having an inwardly disposed radial flange at its outermost end engaging the end of said core, said raceway portion extending beyond the ends of said rollers, an outwardly extending flange at the larger end of said raceway portion overlapping the end of said resilient core and an inwardly extending flange at the smaller end of said raceway portion extending into proximity with a portion of the inner bearing cone.

2. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, a retaining ring holding said cup in said housing, said outer shell having an inwardly disposed radial flange at its outermost end engaging the end of said core, said raceway portion extending beyond the ends of said rollers, an outwardly extending flange at the larger end of said raceway portion overlapping the end of said resilient core, an inwardly extending flange at the smaller end of said raceway portion extending into proximity with a portion of the inner bearing cone, a sleeve extending axially from the inner periphery of said retaining ring and an inwardly extending radial flange at the outermost end of said sleeve spaced from said flange at the smaller end of said raceway portion and cooperating therewith to form a bearing seal.

3. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, a retaining ring holding said cup in said housing, said outer shell having an inwardly disposed radial flange at its outermost end engaging the end of said core, said raceway portion extending beyond the ends of said rollers, an outwardly extending flange at the larger end of said raceway portion overlapping the end of said resilient core, an inwardly extending flange at the smaller end of said raceway portion extending into proximity with a portion of the inner bearing cone, a sleeve extending axially from the inner periphery of said retaining ring, an inwardly extending radial flange at the outermost end of said sleeve spaced from said flange at the smaller end of said raceway portion and cooperating therewith to form a bearing seal and a packing between said radial flange at the smaller end of said raceway portion and said radial flange at the end of said sleeve of said retaining ring.

4. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, a retaining ring holding said cup in said housing, said housing having a peripheral groove in its interior to receive said ring, said outer shell having an inwardly disposed radial flange at its outermost end engaging the end of said core, said raceway portion extending beyond the ends of said rollers, an outwardly extending flange at the larger end of said raceway portion overlapping the end of said resilient core, an inwardly extending flange at the smaller end of said raceway portion extending into proximity with a portion of the inner bearing cone, a sleeve extending axially from the inner periphery of said retaining ring and an inwardly extending radial flange at the outermost end of said sleeve.

5. A roller bearing mounting comprising an inner bearing cone, taper rollers thereon, an outer bearing cup comprising a conical metal raceway portion, an outer cylindrical metal shell portion and an intermediate resilient core portion, a housing in which said cup is mounted, a retaining ring holding said cup in said housing, said housing having a peripheral groove in its interior to receive said ring and said ring being notched around its outer periphery to facilitate mounting in said groove, said outer shell having an inwardly disposed radial flange at its outermost end engaging the end of said core, said raceway portion extending beyond the ends of said rollers, an outwardly extending flange at the larger end of said raceway portion overlapping the end of said resilient core, an inwardly extending flange at the smaller end of said raceway portion extending into proximity with a portion of the inner bearing cone, a sleeve extending axially from the inner periphery of said retaining ring and an inwardly extending radial flange at the outermost end of said sleeve.

6. A roller bearing mounting comprising an inner bearing cone having two conical raceways, taper rollers on said raceways, an outer bearing cup for each set of rollers comprising a conical metal raceway portion, an outer cylindrical metal shell portion and an intermediate resilient core portion, said outer shell portion having an inturned radial end flange overlapping the end of said resilient core, a retaining ring for holding each of said cups in said housing, said housing having internal peripheral grooves near its ends for receiving said rings, the outermost ends of said raceway portions extending beyond the ends of the rollers and beyond the planes of said retaining rings, inwardly extending flanges at said outermost ends extending into proximity with portions of said inner bearing cone, sleeves extending outwardly from the inner peripheries of said retaining rings and inwardly extending flanges at the ends of said sleeves, spaced from said end flanges of said raceway portions.

ERNEST WOOLER.
JOHN B. BAKER.